(12) United States Patent
Malocho et al.

(10) Patent No.: US 12,546,039 B2
(45) Date of Patent: Feb. 10, 2026

(54) NONWOVEN FABRICS INCLUDING RECYCLED POLYPROPYLENE

(71) Applicant: Berry Global, Inc., Evansville, IN (US)

(72) Inventors: Miriam Malocho, Monchengladbach (DE); Patrick Harz, Berlin (DE)

(73) Assignee: MAGNERA CORPORATION, Charlotte, NC (US)

( * ) Notice: Subject to any disclaimer, the term of this patent is extended or adjusted under 35 U.S.C. 154(b) by 559 days.

(21) Appl. No.: 18/070,988

(22) Filed: Nov. 29, 2022

(65) Prior Publication Data

US 2023/0167590 A1 Jun. 1, 2023

Related U.S. Application Data

(60) Provisional application No. 63/284,064, filed on Nov. 30, 2021.

(51) Int. Cl.
*D04H 1/4291* (2012.01)
*B01D 39/16* (2006.01)
(Continued)

(52) U.S. Cl.
CPC ......... *D04H 1/4291* (2013.01); *B01D 39/163* (2013.01); *B01D 46/0002* (2013.01); *B32B 5/022* (2013.01); *B32B 5/268* (2021.05); *B32B 5/269* (2021.05); *D04H 1/56* (2013.01); *D04H 1/732* (2013.01); *B01D 2239/0421* (2013.01); *B01D 2239/0478* (2013.01); *B01D 2239/0618* (2013.01); *B01D 2239/0622* (2013.01); *B01D 2239/065* (2013.01); *B01D 2239/10* (2013.01); *B32B 2250/20* (2013.01); *B32B 2262/0253* (2013.01); *B32B 2432/00* (2013.01);
(Continued)

(58) Field of Classification Search
CPC ........ D04H 1/4291; D04H 1/56; D04H 1/732; B32B 5/268; B32B 5/269
See application file for complete search history.

(56) References Cited

U.S. PATENT DOCUMENTS 5,783,502 A * 7/1998 Swanson ................ A01N 25/10
424/78.17
2004/0213918 A1* 10/2004 Mikhael ................ D06M 10/08
427/446
(Continued)

FOREIGN PATENT DOCUMENTS

CN 105208989 A 12/2015
CN 112120317 A 12/2020
(Continued)

OTHER PUBLICATIONS

International Search Report and Written Opinion issued in corresponding international application No. PCT/US2022/051185 on Apr. 11, 2023, all enclosed pages cited herein.
(Continued)

*Primary Examiner* — Robert Clemente
(74) *Attorney, Agent, or Firm* — BURR & FORMAN

(57) ABSTRACT

Nonwoven fabrics are provided that include a first meltblown layer, in which the first meltblown layer comprises a first polymeric material including (i) a first polymer component and (ii) optionally one or more first additives. The first polymer component comprises a first recycled-polypropylene (rPP).

20 Claims, 3 Drawing Sheets

(51) Int. Cl.
*B01D 46/00* (2022.01)
*B32B 5/02* (2006.01)
*B32B 5/26* (2006.01)
*D04H 1/56* (2006.01)
*D04H 1/732* (2012.01)

(52) U.S. Cl.
CPC .... *B32B 2571/00* (2013.01); *D10B 2321/022* (2013.01); *D10B 2503/00* (2013.01); *D10B 2505/04* (2013.01); *D10B 2509/00* (2013.01)

(56) References Cited

U.S. PATENT DOCUMENTS

| | | | | |
|---|---|---|---|---|
| 2014/0331622 | A1* | 11/2014 | Gruenbacher | B01D 46/42 55/467 |
| 2014/0331623 | A1* | 11/2014 | Gruenbacher | B01D 46/0004 55/364 |
| 2014/0331625 | A1* | 11/2014 | Gruenbacher | B01D 46/02 55/467 |
| 2014/0331859 | A1* | 11/2014 | Gruenbacher | F24F 13/28 95/26 |
| 2015/0086760 | A1* | 3/2015 | Castillo | D04H 1/435 428/198 |
| 2015/0352480 | A1* | 12/2015 | Morison | B01D 46/0086 96/417 |
| 2019/0059670 | A1* | 2/2019 | Schultink | B01D 39/163 |
| 2019/0076766 | A1* | 3/2019 | Sauer | B01D 39/1615 |
| 2020/0060489 | A1* | 2/2020 | Sauer | B01D 39/201 |
| 2020/0070473 | A1 | 3/2020 | Drews et al. | |
| 2022/0072457 | A1* | 3/2022 | Sauer | B32B 5/269 |

FOREIGN PATENT DOCUMENTS

| | | | | |
|---|---|---|---|---|
| CN | 112625341 | A * | 4/2021 | A41D 13/11 |
| EP | 3097224 | A1 | 11/2016 | |
| JP | 2006510499 | A | 3/2006 | |
| JP | 2015089984 | A | 5/2015 | |
| TW | 201224239 | A | 6/2012 | |
| WO | WO-2007145713 | A1 * | 12/2007 | B29B 9/00 |
| WO | 2010125545 | A2 | 11/2010 | |
| WO | 2015112844 | A1 | 7/2015 | |
| WO | 2020127065 | A1 | 6/2020 | |
| WO | 2021231695 | A1 | 11/2021 | |

OTHER PUBLICATIONS

Wadsworth et al: "Conversion of Recycled Polymers/Fibers Into Melt Blown and Spunbonded Nonwovens", Polymers-Plastics Technology and Engineering Internet Citation, vol. 38, No. 3, Jan. 1, 1999 (Jan. 2, 1999), pp. 499-511, XP002775921, Retrieved from the Internet: URL: https://www.academia.edu/15079133/Conversion_of_Recycled_Polymers_Fibers_Into_Melt-Blown_Nonwovens.
Third Party Observation submitted in International Application No. PCT/US2022/051185 on Mar. 1, 2024, all enclosed pages cited.
Second Written Opinion issued in corresponding international application No. PCT/US2022/051185 on Oct. 11, 2023, all enclosed pages cited herein.
Office Action (with translation) issued in corresponding Taiwanese Application No. 111144849 on Oct. 25, 2023, all enclosed pages cited herein.
Third Party Observation submitted to the International Bureau on Jul. 26, 2023 in connection with International Application No. PCT/US2022/051185, all enclosed pages cited.
Communication under Rule 71(3) EPC, Intention to grant from corresponding EP Application No. 22843516.0, Mailed Mar. 31, 2025, all pages cited on its entirety.
Data Sheet for CIBA IRGATEC CR 76, Published 2004.
BASF News Release "BASF helps meltblown non-woven fabric manufacturer in Korea branch out into new area of business", published Sep. 6, 2018.
BASF Brochure "Plastic additives for the textile and fiber industry" publication date unknown.
Decision to Grant (with English Translation) issued in corresponding Taiwanese Patent Application No. 111144849 mailed Nov. 6, 2024, all pages cited in its entirety.
Notice of Reasons for Refusal from corresponding Japanese Application No. 2024-532213, mailed Jun. 3, 2025, all pages cited in its entirety.
Decision to Grant from corresponding Venezuelan Application No. 2022-000249, mailed Jun. 23, 2025, all pages cited in its entirety.
Decision of Refusal from corresponding Japanese Application No. 2024-532213, mailed Sep. 30, 2025, all pages cited in its entirety.
Search Report and Written Opinion from corresponding Brazilian Application No. BR 1120240 10902-0, mailed Oct. 7, 2025, all pages cited in its entirety.
Non-Final Office Action from corresponding Canadian Application No. 3,240,832, mailed Nov. 7, 2025, all pages cited in its entirety.

* cited by examiner

NONWOVEN FABRICS INCLUDING RECYCLED POLYPROPYLENE

CROSS-REFERENCE TO RELATED APPLICATIONS

This application claims priority under 35 U.S.C. § 119(e) to U.S. Provisional Application No. 63/284,064, filed Nov. 30, 2021, which is expressly incorporated by reference herein in its entirety.

TECHNICAL FIELD

Embodiments of the presently-disclosed invention relate generally to nonwoven fabrics including at least one meltblown layer comprising recycled polypropylene (rPP). The nonwoven fabric may include one more additional nonwoven layers, in which the at least one meltblown layer provides an abrasive feature to the nonwoven fabric. In this regard, the nonwoven fabric may be provided in the form of a wipe (e.g., wet or dry), a filter media, or a facemask.

BACKGROUND

Nonwoven fabrics are often employed in the formation of cleaning wipes for a variety of cleaning applications, including personal, home, commercial, and industrial applications. In some genre of cleaning wipes, the cleaning wipes may include a layer having an abrasive material for removing so-called "stuck-on" materials that are difficult to remove.

SUMMARY OF INVENTION

One or more embodiments of the invention may address one or more of the aforementioned problems. Certain embodiments according to the invention provide a nonwoven fabric comprising first nonwoven layer comprising a first meltblown layer. The first meltblown layer may comprise a first polymeric material including (i) a first polymer component and (ii) optionally one or more first additives. The first polymer component may comprise a first recycled-polypropylene (rPP).

In another aspect, the present invention provides a method of making a nonwoven fabric. The method may comprise the following: (a) forming a first polymeric melt comprising (i) a first polymer component and (ii) optionally one or more first additives, in which the first polymer component comprises a first recycled-polypropylene (rPP); (b) producing a first nonwoven layer comprising a first meltblown layer, in which the first meltblown layer comprises a plurality of first meltblown fibers; and (c) consolidating the plurality of first meltblown fibers to form the nonwoven fabric, such as those described and disclosed herein.

In yet another aspect, the present invention provides an article comprising a wipe material. The wipe material may comprise a plurality of interconnected individual wipes. The plurality of interconnected individual wipes may comprise a nonwoven fabric such as those described and disclosed herein. The plurality of interconnected individual wipes, in accordance with certain embodiments of the invention, may be defined by a plurality of perforations. The wipe material, in accordance with certain embodiments of the invention, may comprise a plurality of individual wipes (e.g., interconnected or separated from each other) comprising a nonwoven fabric such as those described and disclosed herein, in which the plurality of wipes are housed within a container.

In yet another aspect, the present invention provides an article comprising a filter media. The filter media may comprise a nonwoven fabric such as those described and disclosed herein, in which the nonwoven fabric is optionally housed within a frame. The filter media, in accordance with certain embodiments of the invention, may comprise a facemask including a nonwoven fabric as described and disclosed herein. The facemask may include one more straps attached directly or indirectly to the nonwoven fabric.

BRIEF DESCRIPTION OF THE DRAWING(S)

The invention now will be described more fully hereinafter with reference to the accompanying drawings, in which some, but not all embodiments of the invention are shown. Indeed, this invention may be embodied in many different forms and should not be construed as limited to the embodiments set forth herein; rather, these embodiments are provided so that this disclosure will satisfy applicable legal requirements. Like numbers refer to like elements throughout, and wherein.

Figure 2:
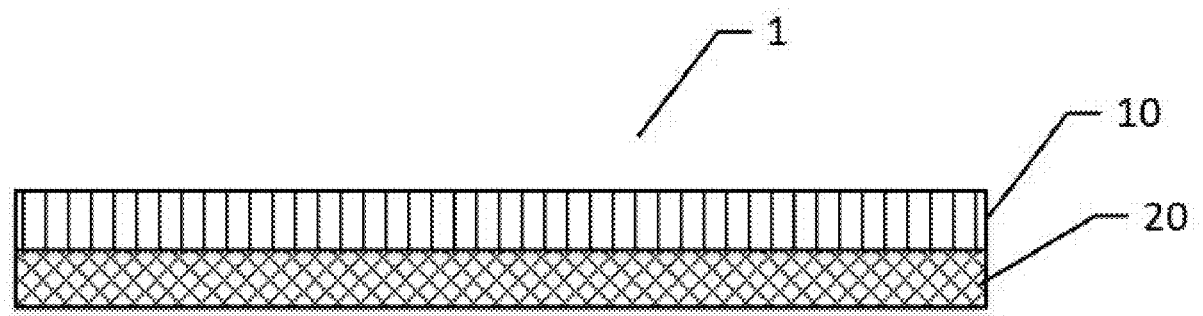
FIG. 2 illustrate a nonwoven fabric including a first nonwoven layer comprising a first meltblown nonwoven layer comprising rPP supported on a second nonwoven layer in accordance with certain embodiments of the invention.
Figure 3:
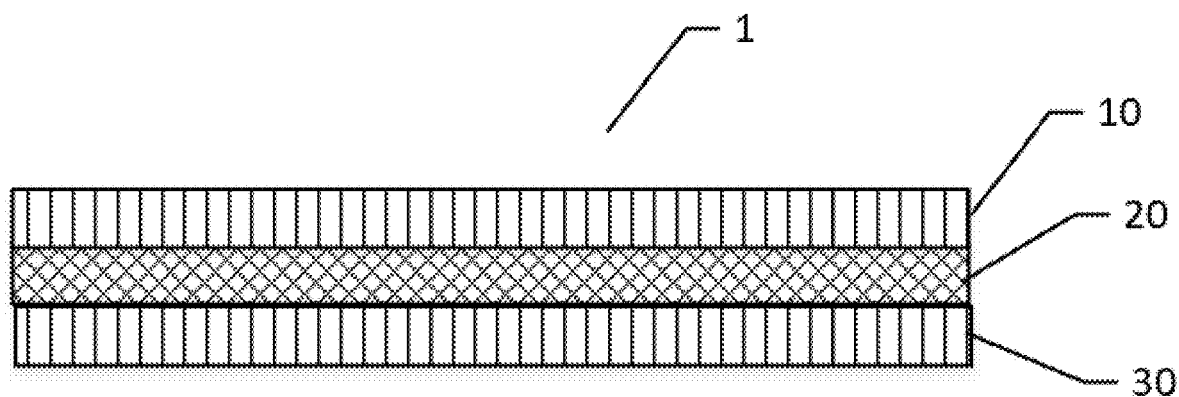
FIG. 3 illustrates a nonwoven fabric including a second nonwoven layer located between a first nonwoven layer and a third nonwoven layer, in which the first nonwoven layer and the third nonwoven layer each comprise a meltblown layer comprising rPP.
Figure 4:
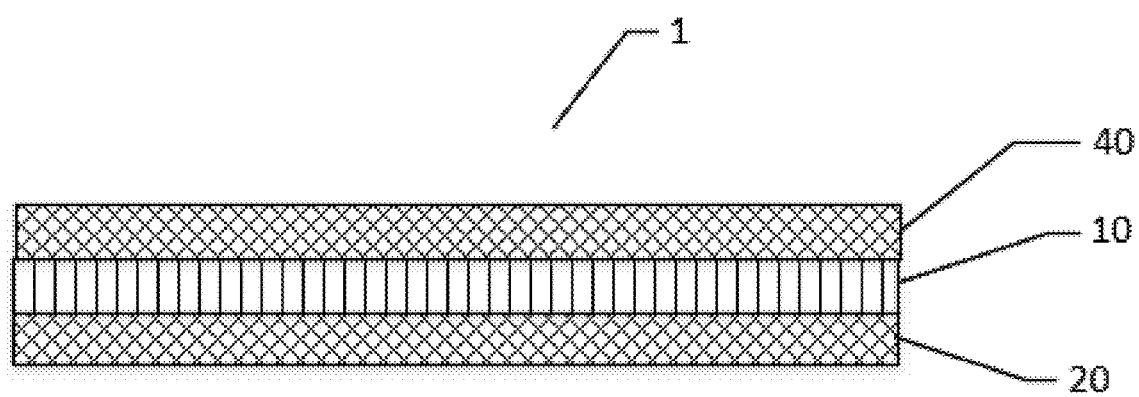
Figure 5:
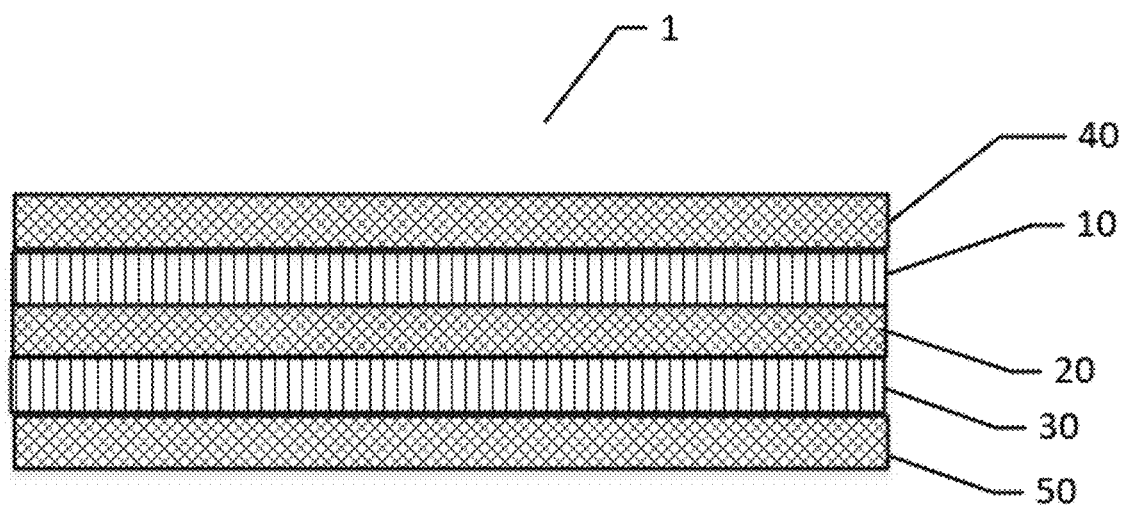

FIG. 4 illustrates the nonwoven fabric of FIG. 2, in which the nonwoven fabric further comprises a first outermost nonwoven layer located over the first meltblown layer; and FIG. 5 illustrates the nonwoven fabric of FIG. 3, in which the nonwoven fabric further comprises a first outermost nonwoven layer located over the first meltblown layer and a second outermost nonwoven layer located over a second meltblown layer.

DETAILED DESCRIPTION

The invention now will be described more fully hereinafter with reference to the accompanying drawings, in which some, but not all embodiments of the invention are shown. Indeed, this invention may be embodied in many different forms and should not be construed as limited to the embodiments set forth herein; rather, these embodiments are provided so that this disclosure will satisfy applicable legal requirements. As used in the specification, and in the appended claims, the singular forms "a", "an", "the", include plural referents unless the context clearly dictates otherwise.

The terms "substantial" or "substantially" may encompass the whole amount as specified, according to certain embodiments of the invention, or largely but not the whole amount specified (e.g., 95%, 96%, 97%, 98%, or 99% of the whole amount specified) according to other embodiments of the invention.

The terms "polymer" or "polymeric", as used interchangeably herein, may comprise homopolymers, copolymers, such as, for example, block, graft, random, and alternating copolymers, terpolymers, etc., and blends and modifications thereof. Furthermore, unless otherwise specifically limited, the term "polymer" or "polymeric" shall include all possible structural isomers; stereoisomers including, without limitation, geometric isomers, optical isomers or enantiomers; and/or any chiral molecular configuration of such polymer or polymeric material. These configurations include, but are not limited to, isotactic, syndiotactic, and atactic configurations of such polymer or polymeric material. The term "polymer" or "polymeric" shall also include polymers made from various catalyst systems including, without limitation, the Ziegler-Natta catalyst system and the metallocene/single-site catalyst system. The term "polymer" or "polymeric" shall also include, in according to certain embodiments of the invention, polymers produced by fermentation process or biosourced.

The terms "elastomer" or "elastomeric", as used interchangeably herein, may comprise any material that upon application of a biasing force, can stretch to an elongated length of at least 110% or even to 125% of its relaxed, original length (i.e., can stretch to at least 10% or even 25% more than its original length), without rupture or breakage. Upon release of the applied force, for example, the material may recover at least 40%, at least 60%, or even at least 80% of its elongation. In certain embodiments of the invention, the material may recover from about 20% to about 100% of its elongation, from about 25% to about 95% of its elongation, from about 30% to about 90% of its elongation, from about 40% to about 80% of its elongation, or from about 50% to about 70% of its elongation. For example, a material that has an initial length of 100 mm can extend at least to 110 mm, and upon removal of the force would retract to a length of 106 mm (e.g., exhibiting a 40% recovery). Example elastomers may include Vistamaxx™ propylene-based elastomers (commercially available form ExxonMobile), which comprise copolymers of propylene and ethylene. Vistamaxx™ propylene-based elastomers, for example, comprise isotactic polypropylene microcrystalline regions and random amorphous regions.

The terms "nonwoven" and "nonwoven web", as used herein, may comprise a web having a structure of individual fibers, filaments, and/or threads that are interlaid but not in an identifiable repeating manner as in a knitted or woven fabric. Nonwoven fabrics or webs, according to certain embodiments of the invention, may be formed by any process conventionally known in the art such as, for example, meltblowing processes, spunbonding processes, needle-punching, hydroentangling, air-laid, and bonded carded web processes. A "nonwoven web", as used herein, may comprise a plurality of individual fibers that have not been subjected to a consolidating process.

The terms "fabric" and "nonwoven fabric", as used herein, may comprise a web of fibers in which a plurality of the fibers are mechanically entangled or interconnected, fused together, and/or chemically bonded together. For example, a nonwoven web of individually laid fibers may be subjected to a bonding or consolidation process to bond at least a portion of the individually fibers together to form a coherent (e.g., united) web of interconnected fibers.

The term "consolidated" and "consolidation", as used herein, may comprise the bringing together of at least a portion of the fibers of a nonwoven web into closer proximity or attachment there-between (e.g., thermally fused together, chemically bonded together, and/or mechanically entangled together) to form a bonding site, or bonding sites, which function to increase the resistance to external forces (e.g., abrasion and tensile forces), as compared to the unconsolidated web. The bonding site or bonding sites, for example, may comprise a discrete or localized region of the web material that has been softened or melted and optionally subsequently or simultaneously compressed to form a discrete or localized deformation in the web material. Furthermore, the term "consolidated" may comprise an entire nonwoven web that has been processed such that at least a portion of the fibers are brought into closer proximity or attachment there-between (e.g., thermally fused together, chemically bonded together, and/or mechanically entangled together), such as by thermal bonding or mechanical entanglement (e.g., hydroentanglement) as merely a few examples. Such a web may be considered a "consolidated nonwoven", "nonwoven fabric" or simply as a "fabric" according to certain embodiments of the invention.

The term "staple fiber", as used herein, may comprise a cut fiber from a filament. In accordance with certain embodiments, any type of filament material may be used to form staple fibers. For example, staple fibers may be formed from polymeric fibers, and/or elastomeric fibers. Non-limiting examples of materials may comprise polyolefins (e.g., a polypropylene or polypropylene-containing copolymer), polyethylene terephthalate, and polyamides. The average length of staple fibers may comprise, by way of example only, from about 2 centimeter to about 15 centimeter.

The term "spunbond", as used herein, may comprise fibers which are formed by extruding molten thermoplastic material as filaments from a plurality of fine, usually circular, capillaries of a spinneret with the diameter of the extruded filaments then being rapidly reduced. According to an embodiment of the invention, spunbond fibers are generally not tacky when they are deposited onto a collecting surface and may be generally continuous as disclosed and described herein. It is noted that the spunbond used in certain composites of the invention may include a nonwoven described in the literature as SPINLACE®. Spunbond fibers, for example, may comprises continuous fibers.

As used herein, the term "continuous fibers" refers to fibers which are not cut from their original length prior to being formed into a nonwoven web or nonwoven fabric. Continuous fibers may have average lengths ranging from greater than about 15 centimeters to more than one meter, and up to the length of the web or fabric being formed. For example, a continuous fiber, as used herein, may comprise a fiber in which the length of the fiber is at least 1,000 times larger than the average diameter of the fiber, such as the length of the fiber being at least about 5,000, 10,000, 50,000, or 100,000 times larger than the average diameter of the fiber.

The term "meltblown", as used herein, may comprise fibers formed by extruding a molten thermoplastic material through a plurality of fine die capillaries as molten threads or filaments into converging high velocity, usually hot, gas (e.g. air) streams which attenuate the filaments of molten thermoplastic material to reduce their diameter, which may be to microfiber diameter, according to certain embodiments of the invention. According to an embodiment of the invention, the die capillaries may be circular. Thereafter, the meltblown fibers are carried by the high velocity gas stream and are deposited on a collecting surface to form a web of randomly disbursed meltblown fibers. Meltblown fibers may comprise microfibers which may be continuous or discontinuous and are generally tacky when deposited onto a collecting surface. Meltblown fibers, however, are shorter in length than those of spunbond fibers.

The term "meltblown shot", as used herein, may comprise a coarse non-uniform or non-continuous layer applied in a meltblown process deliberately operated to generate random globules of a polymer interconnected with strands. Moreover, the term "meltblown rope", as used herein, may also comprise a coarse non-uniform or non-continuous layer applied in a meltblown process deliberately operated to generate random "ropes" or bundles of a polymer interconnected with strands. Meltblown rope differs from meltblown shot in that meltblown rope may be more elongated and/or narrower than meltblown shot. Both the meltblown ropes and/or meltblown shot may comprise irregularly shaped fibers, wads, or particles. In this regard, for example, the meltblown ropes and/or meltblown shot may comprise fibers, wads, particles, or globules having non-circular cross-sections. The meltblown ropes and/or meltblown shot may be randomly and irregularly distributed within the body of a meltblown layer and/or on a surface of a meltblown layer. For example, the meltblown ropes and/or meltblown shot may extend on random paths and may intersect and/or cross at random locations. However, the meltblown ropes and/or meltblown shot may not intersect or cross at all.

The term "layer", as used herein, may comprise a generally recognizable combination of similar material types and/or functions existing in the X-Y plane.

All whole number end points disclosed herein that can create a smaller range within a given range disclosed herein are within the scope of certain embodiments of the invention. By way of example, a disclosure of from about 10 to about 15 includes the disclosure of intermediate ranges, for example, of: from about 10 to about 11; from about 10 to about 12; from about 13 to about 15; from about 14 to about 15; etc. Moreover, all single decimal (e.g., numbers reported to the nearest tenth) end points that can create a smaller range within a given range disclosed herein are within the scope of certain embodiments of the invention. By way of example, a disclosure of from about 1.5 to about 2.0 includes the disclosure of intermediate ranges, for example, of: from about 1.5 to about 1.6; from about 1.5 to about 1.7; from about 1.7 to about 1.8; etc.

In one aspect, the present invention provides a nonwoven fabric comprising a nonwoven fabric comprising first nonwoven layer comprising a first meltblown layer. The first meltblown layer may comprise a first polymeric material including (i) a first polymer component and (ii) optionally one or more first additives. The first polymer component comprises a first recycled-polypropylene (rPP). The rPP utilized in any of the nonwoven layers of the nonwoven fabric (e.g., the first meltblown layer or any other layer that may be present in the nonwoven fabric) may be sourced from waste material or scraps, such as spunbond production waste. For example, a polypropylene spunbond line may produce production waste (e.g., trimmed material, low quality web formation, etc.) that may be utilized as the polypropylene source for forming, for example, the meltblown layer(s) of the nonwoven fabric. In this regard, the polypropylene production waste from previous, for example, meltspinning operations may be recycled (e.g., melting the production waste to form a rPP melt and forming meltblown fibers therefrom). In accordance with certain embodiments of the invention, for example, the polypropylene production waste comprises spunbond grade polypropylene having a relatively low melt flow rate that may not be viable for the production of meltblown fibers. In this regard, the rPP melt formed from the production waste (e.g., spunbond grade polypropylene) may also include one or more additives, such as viscosity reducing agents, such that the resulting rPP melt is larger than that of the spunbond grade polypropylene used as the source of polypropylene. By increasing the melt flow rate, for example, via viscosity reduction, the rPP may be meltblown to form a meltblown layer comprising rPP.

In accordance with certain embodiments of the invention, the first polymer component may comprise from 75% to 100% by weight of the first rPP, such as at least about any of the following: 75, 78, 80, 82, 85, 88, and 90% by weight of the first rPP, and/or at most about any of the following: 100, 99, 98, 96, 95, 94, 92, and 90% by weight of the first rPP. In accordance with certain embodiments of the invention, the rPP may be blended with virgin polypropylene, virgin elastomeric polymers, etc. (e.g., the balance of the first polymer component may be virgin polypropylene and/or virgin elastomeric polymers). Examples of virgin elastomeric polymers, for example, may include Vistamaxx™ polymers (e.g., Vistamaxx™ 6202), which are polypropylene-based elastomers that comprises a copolymer of propylene and ethylene. These propylene-based elastomers, for example, comprise isotactic polypropylene microcrystalline regions and random amorphous regions (e.g., ethylene). Such olefinic copolymers may comprise hard blocks and soft blocks, where the hard blocks are primarily propylene and the soft blocks are primarily ethylene. In this regard, the hard blocks (e.g., propylene) may comprise 10-90% by weight of the copolymer while the soft blocks may comprise from 90-10% by weight of the copolymer. In this regard, these copolymers include a random ethylene distribution throughout the copolymer. Vistamaxx™ (e.g., Vistamaxx™ 6202) copolymers are commercially available from ExxonMobil. Vistamaxx™ 6202 has a density of 0.862 g/cc, a MI (190° C./2.16 kg) of 9.1, a MFR (230° C./2.16 kg load) of 20, and an ethylene content of 15% by weight. An additional example includes an olefin diblock copolymer comprising an EP-iPP diblock polymer such as Intune™, which is a polypropylene-based block copolymer including ethylene monomers. By way of further examples, the polypropylene-based elastomer may comprise an EP-iPP diblock polymer that has an ethylene content from 43 to 48% by weight, or from 43.5 to 47% by weight, or from 44 to 47% by weight, based on the weight of the diblock copolymer. In an example embodiment, the EP-iPP diblock polymer may have a propylene content from 57 to 52% by weight, or from 56.5 to 53% by weight, or from 56 to 53% by weight, based on the weight of the EP-iPP diblock polymer.

In accordance with certain embodiments of the invention, the rPP melt and the resulting meltblown layer comprising rPP is devoid of an elastomeric polymer. In this regard, for example, the rPP and the resulting meltblown layer comprising rPP may be formed entirely from polypropylene (e.g., rPP, virgin polypropylene, or blends thereof).

In accordance with certain embodiments of the invention, the first meltblown layer may comprise a plurality of first meltblown fibers having an average diameter greater than about 3 microns. For example, the average diameter of the plurality of first meltblown fibers may be from about 3 microns to about 12 microns, such as at least about any of the following: 3, 4, 5, 6, 7, and 8 microns, and/or at most about any of the following: 12, 11, 10, 9, and 8 microns. In accordance with certain embodiments of the invention, the plurality of first meltblown fibers impart an abrasive feature and/or surface to the nonwoven fabric.

The plurality of first meltblown fibers, for example, may comprise meltblown shot, meltblown ropes, or both. The meltblown shot, the meltblown rope, or both may be randomly and irregularly distributed throughout the meltblown layer, on a first outer surface of the meltblown layer, or both. If present, the meltblown shot, meltblown ropes, or both impart an increased abrasive feature and/or surface to the nonwoven fabric. For instance, the first meltblown layer may comprise an average shot height, rope height, or both from about 0.1 mm to about 1.0 mm, such as at least about any of the following: 0.1, 0.2, 0.3, 0.4, and 0.5 mm, and/or at most about any of the following: 1, 0.9, 0.8, 0.7, 0.6, and 0.5 mm.

In accordance with certain embodiments of the invention, the meltblown shot (if present) may comprise irregularly shaped fibers, wads, or particles. The meltblown rope (if present) may comprise bundles of agglomerated meltblown fibers having a variable cross-section along a length of the meltblown rope.

The first polymer component absent a viscosity reducing agent may have a first melt flow rate (MFR) from about of from about 10 to about 300 g/10 min as determined by ASTM D1238 (230° C./2.16 kg), such as at least about any of the following: 10, 20, 40, 60, 80, 100, 120, 140, and 150 g/10 min as determined by ASTM D1238 (230° C./2.16 kg), and/or at most about any of the following: 300, 280, 260, 240, 220, 200, 180, 160, and 150 g/10 min as determined by ASTM D1238 (230° C./2.16 kg).

As noted above, the first polymeric material may include one or more first additives, in which the one or more first additives may comprise a first viscosity reducing agent. The first viscosity reducing agent, for example, may comprises a first sterically hindered hydroxylamine ester, which may be a peroxide free additive. Such an additive is commercially available as Irgatec® CR76 (i.e., a sterically hindered hydroxylamine ester in a polymer matrix from BASF). This additive, for example, reduces the viscosity of the melt, thereby controlling the degradation of the molecular weight of the polypropylene during spinning. Additionally, it narrows the molecular weight distribution, bringing the advantage of better spinability and viable formation of meltblown layers from rPP. In this regard, the first polymeric material in the presence of the one or more first additives may have a second MFR from about 100 to about 2500 g/10 min as determined by ASTM D1238 (230° C./2.16 kg), such as at least about any of the following: 100, 150, 200, 250, 300, 350, 400, 450, 500, 550, 600, 650, 700, 800, 900, 1000, 1100, and 1200 g/10 min as determined by ASTM D1238 (230° C./2.16 kg), and/or at most about any of the following: 2500, 2200, 2000, 1900, 1800, 1700, 1600, 1500, 1400, 1300, and 1200 g/10 min as determined by ASTM D1238 (230° C./2.16 kg).

In accordance with certain embodiments of the invention, the first polymeric material may comprise from about 0.1 to about 10% by weight of the first viscosity reducing agent, such as at least about any of the following: 0.1, 0.5. 1, 2, 3, 4, and 5% by weight of the first viscosity reducing agent, and/or at most about any of the following: 10, 9, 8, 7, 6, and 5% by weight of the first viscosity reducing agent.

In accordance with certain embodiments of the invention, the first meltblown layer may have a first basis weight from about 1 to about 150 gsm, such as at least about any of the following: 1, 3, 5, 10, 15, 25, 50, and 75 gsm, and/or at most about any of the following: 150, 125, 100, and 75 gsm.

The nonwoven fabric, in accordance with certain embodiments of the invention, may further comprise a hydrophilic finish disposed on an outer surface of the first meltblown layer. Additionally or alternatively, the first polymeric material may comprise a first hydrophilic melt additive (e.g., present within the body of the meltblown fibers and may bloom to the surface of the meltblown fibers over time). Additionally or alternatively, the hydrophilic finish may be imparted by a topical coating of a hydrophilic additive (e.g., an anionic or cationic surfactant), such as commercially available products under the name Stantex® from Pulcra Chemicals, such as Stantex S 6118, S6087-4, 7290, and S 6327 grades, or "Silastol" from Schill+Seilacher (different grades), such as Silastol PHP 26 or PHP 16, each of which are cationic surfactants that provide a durable hydrophilic coating.

Figure 1:
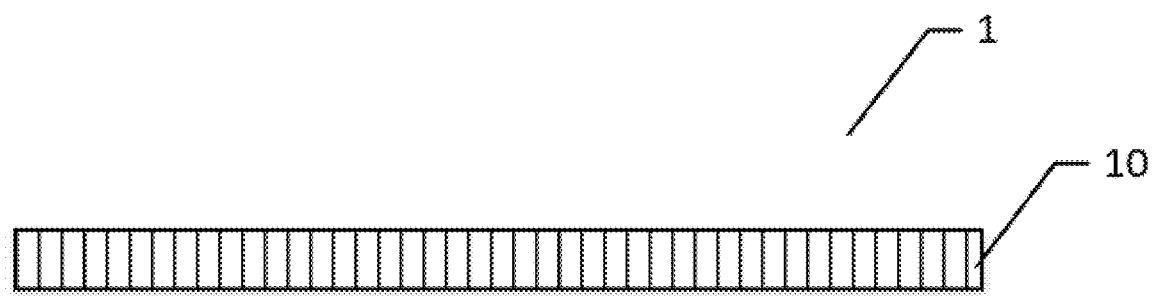
FIG. 1 illustrates a nonwoven fabric comprising a first meltblown nonwoven layer comprising rPP in accordance with certain embodiments of the invention.

FIG. 1 illustrates a nonwoven fabric 1 comprising a first meltblown nonwoven layer 10 comprising rPP in accordance with certain embodiments of the invention. In this regard, nonwoven fabric may be formed entirely from meltblown fibers (e.g., either from a single meltblown beam or multiple meltblown beams). In accordance with certain embodiments of the invention, the first meltblown nonwoven layer may be consolidated by any suitable means, such as those described and disclosed herein.

In accordance with certain embodiments of the invention, the nonwoven fabric may further comprise a second nonwoven layer (e.g., a support layer for the first meltblown layer) bonded to the first nonwoven layer (i.e., the first meltblown layer). The second nonwoven layer may comprise a spunbond layer, a meltblown layer, a bonded carded web of staple fibers, a mechanically consolidated layer, or any combination thereof. The second nonwoven layer may comprise a synthetic polymer, such as a polyolefin, a polyester, a polyamide, or any combination thereof. For example, the synthetic polymer may comprise a virgin polypropylene, a recycled polypropylene, a virgin polyethylene, a recycled polyethylene, a virgin polyester, a recycled polyester, or any combination thereof. Additionally or alternatively, the second nonwoven layer may comprise cellulosic fibers, such as natural cellulosic fibers, synthetic cellulosic fibers, or any combination thereof.

The second nonwoven layer may comprise from 50% to 100% by weight of a virgin synthetic polymer, such as virgin polypropylene, such as at least about any of the following: 50, 55, 60, 65, 70, 75, 78, 80, 82, 85, 88, and 90% by weight of the virgin synthetic polymer, and/or at most about any of the following: 100, 99, 98, 96, 95, 94, 92, and 90% by weight of the virgin synthetic polymer. Additionally or alternatively, the second nonwoven layer may comprise from 50% to 100% by weight of a recycled synthetic polymer, such as recycled polypropylene, such as at least about any of the following: 50, 55, 60, 65, 70, 75, 78, 80, 82, 85, 88, and 90% by weight of the recycled synthetic polymer, and/or at most about any of the following: 100, 99, 98, 96, 95, 94, 92, and 90% by weight of the recycled synthetic polymer.

In accordance with certain embodiments of the invention, the second nonwoven layer may comprise one or more spunbond nonwoven layers, such as at least about any of the following: 1, 2, 3, 4, and 5 spunbond nonwoven layers, and/or at most about any of the following: 10, 9, 8, 7, 6, and 5 spunbond nonwoven layers. Additionally or alternatively, the second nonwoven layer may comprises an SMS structure or a spunbond-cellulosic-spunbond structure, in which the spunbond-cellulosic-spunbond structure comprises a mechanically consolidated material, such as a hydroentangled nonwoven material, a needle-punched nonwoven material, or air-entangled nonwoven material.

In accordance with certain embodiments of the invention, the second nonwoven layer may have a first basis weight from about 1 to about 150 gsm, such as at least about any of the following: 1, 3, 5, 10, 15, 25, 50, and 75 gsm, and/or at most about any of the following: 150, 125, 100, and 75 gsm. In this regard, for example, the nonwoven fabric may have a basis weight (combined from the first nonwoven layer and the second nonwoven layer) from about 2 to about 300 gsm, such as at least about any of the following: 2, 6, 10, 20, 30, 50, 100, 125, and 150 gsm, and/or at most about any of the following: 300, 275, 250, 225, 200, 175, and 150 gsm.

FIG. 2, for example, illustrate a nonwoven fabric 1 including a first nonwoven layer 10 comprising a first meltblown nonwoven layer comprising rPP supported on a second nonwoven layer 20 in accordance with certain embodiments of the invention.

In accordance with certain embodiments of the invention, the nonwoven fabric may comprise a third nonwoven layer. The third nonwoven layer may comprise a second meltblown layer, in which the second nonwoven layer is located directly or indirectly between the first nonwoven layer and the third nonwoven layer. In this regard, the second nonwoven layer may function as a support layer that provides structural integrity for both the first meltblown layer and the second meltblown layer. The second meltblown layer comprises a second polymeric material including (i) a second polymer component and (ii) optionally one or more second additives, in which the second polymer component comprises a second recycled-polypropylene (rPP). The first polymer component and the second polymer component may be the same or different, and the one or more first additives and the one or more second additives may be the same or different.

In accordance with certain embodiments of the invention, the second polymer component may comprise from 75% to 100% by weight of the second rPP, such as at least about any of the following: 75, 78, 80, 82, 85, 88, and 90% by weight of the second rPP, and/or at most about any of the following: 100, 99, 98, 96, 95, 94, 92, and 90% by weight of the second rPP. In accordance with certain embodiments of the invention, the rPP may be blended with virgin polypropylene, virgin elastomeric polymers such as those described and disclosed herein, etc. (e.g., the balance of the first polymer component may be virgin polypropylene and/or virgin elastomeric polymers). In accordance with certain embodiments of the invention, the rPP melt for the second polymeric material and the resulting second meltblown layer comprising rPP is devoid of an elastomeric polymer. In this regard, for example, the rPP and the resulting meltblown layer comprising rPP may be formed entirely from polypropylene (e.g., rPP, virgin polypropylene, or blends thereof).

In accordance with certain embodiments of the invention, the second meltblown layer may comprise a plurality of second meltblown fibers having a second average diameter greater than about 3 microns. For example, the average diameter of the plurality of first meltblown fibers may be from about 3 microns to about 12 microns, such as at least about any of the following: 3, 4, 5, 6, 7, and 8 microns, and/or at most about any of the following: 12, 11, 10, 9, and 8 microns. In accordance with certain embodiments of the invention, the plurality of second meltblown fibers impart an abrasive feature and/or surface to the nonwoven fabric.

The plurality of second meltblown fibers, for example, may comprise meltblown shot, meltblown ropes, or both. The meltblown shot, the meltblown rope, or both may be randomly and irregularly distributed throughout the meltblown layer, on a first outer surface of the second meltblown layer, or both. If present, the meltblown shot, meltblown ropes, or both impart an increased abrasive feature and/or surface to the nonwoven fabric. For instance, the second meltblown layer may comprise an average shot height, rope height, or both from about 0.1 mm to about 1.0 mm, such as at least about any of the following: 0.1, 0.2, 0.3, 0.4, and 0.5 mm, and/or at most about any of the following: 1, 0.9, 0.8, 0.7, 0.6, and 0.5 mm.

In accordance with certain embodiments of the invention, the meltblown shot (if present) may comprise irregularly shaped fibers, wads, or particles. The meltblown rope (if present) may comprise bundles of agglomerated meltblown fibers having a variable cross-section along a length of the meltblown rope.

The second polymer component absent a viscosity reducing agent may have a third melt flow rate (MFR) from about of from about 10 to about 300 g/10 min as determined by ASTM D1238 (230° C./2.16 kg), such as at least about any of the following: 10, 20, 40, 60, 80, 100, 120, 140, and 150 g/10 min as determined by ASTM D1238 (230° C./2.16 kg), and/or at most about any of the following: 300, 280, 260, 240, 220, 200, 180, 160, and 150 g/10 min as determined by ASTM D1238 (230° C./2.16 kg).

As noted above, the second polymeric material may include one or more second additives, in which the one or more first additives may comprise a second viscosity reducing agent. The second viscosity reducing agent, for example, may comprises a second sterically hindered hydroxylamine ester, which may be a peroxide free additive. Such an additive is commercially available as Irgatec® CR76 (i.e., a sterically hindered hydroxylamine ester in a polymer matrix from BASF). This additive, for example, reduces the viscosity of the melt, thereby controlling the degradation of the molecular weight of the polypropylene during spinning. Additionally, it narrows the molecular weight distribution, bringing the advantage of better spinability and viable formation of meltblown layers from rPP. In this regard, the second polymeric material in the presence of the one or more first additives may have a fourth MFR from about 100 to about 2500 g/10 min as determined by ASTM D1238 (230° C./2.16 kg), such as at least about any of the following: 100, 150, 200, 250, 300, 350, 400, 450, 500, 550, 600, 650, 700, 800, 900, 1000, 1100, and 1200 g/10 min as determined by ASTM D1238 (230° C./2.16 kg), and/or at most about any of the following: 2500, 2200, 2000, 1900, 1800, 1700, 1600, 1500, 1400, 1300, and 1200 g/10 min as determined by ASTM D1238 (230° C./2.16 kg).

In accordance with certain embodiments of the invention, the second polymeric material may comprise from about 0.1 to about 10% by weight of the second viscosity reducing agent, such as at least about any of the following: 0.1, 0.5. 1, 2, 3, 4, and 5% by weight of the first viscosity reducing agent, and/or at most about any of the following: 10, 9, 8, 7, 6, and 5% by weight of the second viscosity reducing agent.

In accordance with certain embodiments of the invention, the second meltblown layer may have a third basis weight from about 1 to about 150 gsm, such as at least about any of the following: 1, 3, 5, 10, 15, 25, 50, and 75 gsm, and/or at most about any of the following: 150, 125, 100, and 75 gsm.

The nonwoven fabric, in accordance with certain embodiments of the invention, may further comprise a hydrophilic finish disposed on an outer surface of the second meltblown layer. Additionally or alternatively, the second polymeric material may comprise a second hydrophilic melt additive (e.g., present within the body of the meltblown fibers and may bloom to the surface of the meltblown fibers over time). Additionally or alternatively, the hydrophilic finish may be imparted by a topical coating of a hydrophilic additive (e.g., an anionic or cationic surfactant), such as commercially available products under the name Stantex® from Pulcra Chemicals, such as Stantex S 6118, S6087-4, 7290, and S 6327 grades, or "Silastol" from Schill+Seilacher (different grades), such as Silastol PHP 26 or PHP 16, each of which are cationic surfactants that provide a durable hydrophilic coating.

FIG. 3 illustrates a nonwoven fabric 1 including a second nonwoven layer 20 located between a first nonwoven layer 10 (i.e., the first meltblown layer) and a third nonwoven layer 30 (i.e., the second meltblown layer), in which the first nonwoven layer and the third nonwoven layer each comprise a meltblown layer comprising rPP as described and disclosed herein.

In accordance with certain embodiments of the invention, the nonwoven fabric may comprise a first outermost nonwoven layer located over the first nonwoven layer. FIG. 4, for example, illustrates the nonwoven fabric 1 of FIG. 2, in which the nonwoven fabric 1 further comprises a first outermost nonwoven layer 40 located over the first meltblown layer. The first outermost nonwoven layer 40 may be the same or different than that of the second nonwoven layer 20. Additionally or alternatively, the nonwoven fabric may comprise a second outermost nonwoven layer located over the third nonwoven layer. FIG. 5, for example, illustrates the nonwoven fabric 1 of FIG. 3, in which the nonwoven fabric 1 further comprises a first outermost nonwoven layer 40 located over the first meltblown layer 10 and a second outermost nonwoven layer 50 located over a second meltblown layer 30. The second outermost nonwoven layer 50 may be same or different than the second nonwoven layer 20 and/or the same as the first outermost nonwoven layer 40.

In accordance with certain embodiments of the invention, the first outermost nonwoven layer, the second outermost nonwoven layer, or both may independently from each other comprise a spunbond layer, a meltblown layer, a bonded carded web of staple fibers, a mechanically consolidated layer, or any combination thereof. The first outermost nonwoven layer, the second outermost nonwoven layer, or both may comprise a synthetic polymer, such as a polyolefin, a polyester, a polyamide, or any combination thereof. The synthetic polymer, for example, may comprise a virgin polypropylene, a recycled polypropylene, a virgin polyethylene, a recycled polyethylene, a virgin polyester, a recycled polyester, or any combination thereof.

Additionally or alternatively, the first outermost nonwoven layer, the second outermost nonwoven layer, or both comprises cellulosic fibers, such as natural cellulosic fibers, synthetic cellulosic fibers, or any combination thereof.

In accordance with certain embodiments of the invention, the first outermost nonwoven layer, the second outermost nonwoven layer, or both may independently from each other comprises from 50% to 100% by weight of a virgin synthetic polymer, such as virgin polypropylene, such as at least about any of the following: 50, 55, 60, 65, 70, 75, 78, 80, 82, 85, 88, and 90% by weight of the virgin synthetic polymer, and/or at most about any of the following: 100, 99, 98, 96, 95, 94, 92, and 90% by weight of the virgin synthetic polymer. In accordance with certain embodiments of the invention, the first outermost nonwoven layer, the second outermost nonwoven layer, or both may independently from each other comprises from 50% to 100% by weight of a recycled synthetic polymer, such as recycled polypropylene, such as at least about any of the following: 50, 55, 60, 65, 70, 75, 78, 80, 82, 85, 88, and 90% by weight of the recycled synthetic polymer, and/or at most about any of the following: 100, 99, 98, 96, 95, 94, 92, and 90% by weight of the recycled synthetic polymer.

In accordance with certain embodiments of the invention, the first outermost nonwoven layer, the second outermost nonwoven layer, or both may independently from each other comprise one or more spunbond nonwoven layers, such as at least about any of the following: 1, 2, 3, 4, and 5 spunbond nonwoven layers, and/or at most about any of the following: 10, 9, 8, 7, 6, and 5 spunbond nonwoven layers. Additionally or alternatively, the first outermost nonwoven layer, the second outermost nonwoven layer, or both may independently from each other comprises a spunbond-cellulosic-spunbond structure. The spunbond-cellulosic-spunbond structure, for example, may comprise a mechanically consolidated material, such as a hydroentangled nonwoven material, a needle-punched nonwoven material, or air-entangled nonwoven material.

The first outermost nonwoven layer, the second outermost nonwoven layer, or both independently from each other may have a basis weight that is less than that of the second nonwoven layer. For instance, the first outermost nonwoven layer, the second outermost nonwoven layer, or both may comprises a relatively light or thin layer that overlays and helps secure the meltblown fibers of the respective meltblown layers comprising rPP to the second nonwoven layer. In this regard, the first outermost nonwoven layer, the second outermost nonwoven layer, or both may facilitate the reduction in the formation of lint from the respective meltblown layers comprising rPP while also having a basis weight and/or thickness that is sufficiently low so as to not negate the abrasive features imparted by the respective meltblown layers comprising rPP. For example, the first outermost nonwoven layer, the second outermost nonwoven layer, or both may constitute a thin veil or netting through which the abrasive features of the respective meltblown layers comprising rPP may be realized. In accordance with certain embodiments of the invention, the first outermost nonwoven layer, the second outermost nonwoven layer, or both may independently from each other have a basis weight from about 1 to about 150 gsm, such as at least about any of the following: 1, 3, 5, 10, 15, 25, 50, and 75 gsm, and/or at most about any of the following: 150, 125, 100, and 75 gsm.

In accordance with certain embodiments of the invention, the first outermost nonwoven layer, the second outermost nonwoven layer, or both may comprise a hydrophilic finish applied to an outermost surface thereof. Additionally or alternatively, the first outermost nonwoven layer, the second outermost nonwoven layer, or both may comprise a plurality of fibers including a hydrophilic melt additive.

In another aspect, the present invention provides a method of making a nonwoven fabric. The method may comprise the following: (a) forming a first polymeric melt comprising (i) a first polymer component and (ii) optionally one or more first additives, in which the first polymer component comprises a first recycled-polypropylene (rPP); (b) producing a first nonwoven layer comprising a first meltblown layer, in which the first meltblown layer comprises a plurality of first meltblown fibers; and (c) consolidating the plurality of first meltblown fibers to form the nonwoven fabric, such as those described and disclosed herein.

In accordance with certain embodiments of the invention, the first polymer component (in the absence of a viscosity reducing agent) may have a first melt flow rate (MFR) from about of from about 10 to about 300 g/10 min as determined by ASTM D1238 (230° C./2.16 kg), such as at least about any of the following: 10, 20, 40, 60, 80, 100, 120, 140, and 150 g/10 min as determined by ASTM D1238 (230° C./2.16 kg), and/or at most about any of the following: 300, 280, 260, 240, 220, 200, 180, 160, and 150 g/10 min as determined by ASTM D1238 (230° C./2.16 kg). In this regard, the method may comprise forming the first polymeric melt by blending the first polymeric component with the one or more first additives, such as a first viscosity reducing agent as described and disclosed herein, such that the first polymeric material has a second MFR from about 100 to about 2500 g/10 min as determined by ASTM D1238 (230° C./2.16 kg), such as at least about any of the following: 100, 150, 200, 250, 300, 350, 400, 450, 500, 550, 600, 650, 700, 800, 900, 1000, 1100, and 1200 g/10 min as determined by ASTM D1238 (230° C./2.16 kg), and/or at most about any of the following: 2500, 2200, 2000, 1900, 1800, 1700, 1600, 1500, 1400, 1300, and 1200 g/10 min as determined by ASTM D1238 (230° C./2.16 kg). As noted above, the first polymeric material may comprise from about 0.1 to about 10% by weight of the first viscosity reducing agent, such as at least about any of the following: 0.1, 0.5. 1, 2, 3, 4, and 5% by weight of the first viscosity reducing agent, and/or at most about any of the following: 10, 9, 8, 7, 6, and 5% by weight of the first viscosity reducing agent.

In accordance with certain embodiments of the invention, the method may further comprise a step of forming or providing a second nonwoven layer, wherein the second nonwoven layer comprises a spunbond layer, a meltblown layer, a bonded carded web of staple fibers, a mechanically consolidated layer, or any combination thereof, and bonding the first nonwoven layer and the second nonwoven layer together to form a multilayer nonwoven fabric. In this regard, the bonding step may comprise any consolidation means as described and disclosed herein. In accordance with certain embodiments of the invention, the method may comprise meltblowing the plurality of first meltblown fibers directly onto the second nonwoven layer followed by bonding the first nonwoven layer and the second nonwoven layer together.

In accordance with certain embodiments of the invention, the method may comprise forming or providing a third nonwoven layer comprising a second meltblown layer, in which the second nonwoven layer is located directly or indirectly between the first nonwoven layer and the third nonwoven layer. The second meltblown layer may comprise a second polymeric material including (i) a second polymer component and (ii) optionally one or more second additives, wherein the second polymer component comprises a second recycled-polypropylene (rPP). In accordance with certain embodiments of the invention, the first polymer component and the second polymer component may be the same or different, and the one or more first additives and the one or more second additives may be the same or different.

In accordance with certain embodiments of the invention, the first polymer component, the second polymer component, or both may independently from each other comprise from 75% to 100% by weight of rPP, such as at least about any of the following: 75, 78, 80, 82, 85, 88, and 90% by weight of rPP, and/or at most about any of the following: 100, 99, 98, 96, 95, 94, 92, and 90% by weight of rPP. In accordance with certain embodiments of the invention, the rPP may be blended with virgin polypropylene, virgin elastomeric polymers such as those described and disclosed herein, etc. (e.g., the balance of the first polymer component may be virgin polypropylene and/or virgin elastomeric polymers). In accordance with certain embodiments of the invention, the rPP melt and the resulting meltblown layer(s) comprising rPP is devoid of an elastomeric polymer. In this regard, for example, the rPP and the resulting meltblown layer(s) comprising rPP may be formed entirely from polypropylene (e.g., rPP, virgin polypropylene, or blends thereof).

In accordance with certain embodiments of the invention, the method may also comprise a step of providing or forming a first outermost nonwoven layer (e.g., as described and disclosed herein) located over the first nonwoven layer. The method may also include a step of providing or forming a second outermost nonwoven layer (e.g., as described and disclosed herein) located over the third nonwoven layer. The first outermost nonwoven layer, the second outermost nonwoven layer, or both may independently from each other comprise a spunbond layer, a meltblown layer, a bonded carded web of staple fibers, a mechanically consolidated layer, or any combination thereof.

In accordance with certain embodiments of the invention, one or more the nonwoven layers may be consolidated individually or together to form the nonwoven fabric my a variety of consolidation means, such as those described and disclosed herein. For example, one or more the nonwoven layers may be consolidated individually or together to form the nonwoven fabric may comprise a thermal bonding operation, an ultrasonic bonding operation, a mechanical bonding operation, an adhesive bonding operation, or any combination thereof. The consolidating step, for example, may comprise forming a plurality of individual bond sites by a thermal bonding operation or an ultrasonic operation. In this regard, the plurality of individual bond sites define a bonded area. The bonded area, for instance, may comprise from about 3% to about 30% of the nonwoven fabric, such as at least about any of the following: 3, 4, 5, 6, 8, 10, 12, 14, and 15%, and/or at most about any of the following: 30, 28, 26, 25, 24, 22, 20, 18, 16, and 15%.

In yet another aspect, the present invention provides an article comprising a wipe material. The wipe material may comprise a plurality of interconnected individual wipes. The plurality of interconnected individual wipes may comprise a nonwoven fabric such as those described and disclosed herein. The plurality of interconnected individual wipes, in accordance with certain embodiments of the invention, may be defined by a plurality of perforations. The wipe material, in accordance with certain embodiments of the invention, may comprise a plurality of individual wipes (e.g., interconnected or separated from each other) comprising a nonwoven fabric such as those described and disclosed herein, in which the plurality of wipes are housed within a container.

In accordance with certain embodiments of the invention, the wipe material may comprise a wet wipe or a dry wipe. For example, a wet wipe may be pre-loaded with a cleaning composition, antimicrobial composition, or a lotion. Such wet wipes may be removed from a package and immediately used to clean and/or disinfect a surface of interest. In accordance with certain embodiments of the invention, a dry wipe may be devoid of a liquid composition (e.g., cleaning composition, antimicrobial composition, lotion, etc.). In such dry wipes, the dry wipe may be removed from a package and used directly on a surface to be cleaned or first treated with a liquid composition (e.g., cleaning composition, antimicrobial composition, lotion, etc.) at the point of use. In this regard, the wipe material may be suitable for a wide variety of wiping and/or cleaning applications. For example, the wipe material may be embodied as a scrubby wipe by utilizing the abrasive feature associated with the meltblown layer(s) comprising rPP, a disinfectant wipe (e.g., dry or wet wipe), or an industrial wipe.

In yet another aspect, the present invention provides an article comprising a filter media. The filter media may comprise a nonwoven fabric such as those described and disclosed herein, in which the nonwoven fabric is optionally housed within a frame. For example, the filter media may be embodied as a residential or commercial air filter for associated HVAC systems, air filters for vehicles, or air filters for industrial applications (e.g., clean rooms). The filter media, in accordance with certain embodiments of the invention, may comprise a facemask including a nonwoven fabric as That which is claimed:

1. A nonwoven fabric, comprising: a first nonwoven layer comprising a first meltblown layer comprising a first plurality of meltblown fibers comprising meltblown shot, meltblown ropes, or both, wherein the meltblown shot, the meltblown rope, or both is randomly and irregularly distributed throughout the first meltblown layer, on a first outer surface of the first meltblown layer, or both, and the first meltblown layer comprises a first polymeric material including (i) a first polymer component and (ii) optionally one or more first additives, wherein the first polymer component comprises a first recycled-polypropylene (rPP).

2. The nonwoven fabric of claim 1, wherein the first polymer component comprises from 75% to 100% by weight of the first rPP.

3. The nonwoven fabric of claim 1, wherein the first meltblown layer comprises an average shot height, rope height, or both from about 0.1 mm to about 1.0 mm.

4. The nonwoven fabric of claim 1, wherein the meltblown shot comprises irregularly shaped fibers, wads, or particles.

5. The nonwoven fabric of claim 1, wherein the meltblown rope comprise bundles of agglomerated meltblown fibers having a variable cross-section along a length of the meltblown rope.

6. The nonwoven fabric of claim 1, wherein the first polymer component has a first melt flow rate (MFR) from about of from about 10 to about 300 g/10 min as determined by ASTM D1238 (230 C°/2.16 kg).

7. The nonwoven fabric of claim 1, wherein the first polymeric material includes the one or more first additives, the one or more first additives comprising a first viscosity reducing agent.

8. The nonwoven fabric of claim 7, wherein the first polymeric material has a second MFR from about 100 to about 2500 g/10 min as determined by ASTM D1238 (230 C°/2.16 kg).

9. The nonwoven fabric of claim 1, further comprising a hydrophilic finish disposed on an outer surface of the first meltblown layer, the first polymeric material further comprises a first hydrophilic melt additive, or both.

10. The nonwoven fabric of claim 1, further comprising a second nonwoven layer bonded to the first nonwoven layer.

11. The nonwoven fabric of claim 10, wherein the second nonwoven layer comprises a spunbond layer, a meltblown layer, a bonded carded web of staple fibers, a mechanically consolidated layer, or any combination thereof.

12. A method of making a nonwoven fabric, comprising:
(a) forming a first polymeric melt comprising (i) a first polymer component and (ii) optionally one or more first additives, wherein the first polymer component comprises a first recycled-polypropylene (rPP);
(b) producing a first nonwoven layer comprising a first meltblown layer, the first meltblown layer comprising a plurality of first meltblown fibers comprising meltblown shot, meltblown ropes, or both; and
(c) consolidating the plurality of first meltblown fibers to form the nonwoven fabric,
wherein the meltblown shot, the meltblown rope, or both is randomly and irregularly distributed throughout the first meltblown layer, on a first outer surface of the first meltblown layer, or both.

13. An article, comprising: a plurality of interconnected individual wipes comprising a nonwoven fabric according to claim 1, wherein the plurality of interconnected individual wipes are defined by a plurality of perforations.

14. An article, comprising: a filter media comprising a nonwoven fabric according to claim 1, wherein the nonwoven fabric is housed within a frame.

15. An article, comprising: a facemask comprising a nonwoven fabric according to claim 1, and at least one strap portion.

16. The nonwoven fabric of claim 1, wherein the meltblown shot, meltblown ropes, or both define an abrasive feature for a first outer surface of the nonwoven fabric.

17. The method of claim 12, wherein the first polymer component has a first melt flow rate (MFR) from about of from about 10 to about 300 g/10 min as determined by ASTM D1238 (230 C°/2.16 kg).

18. The method of claim 12, wherein the first polymeric material includes the one or more first additives, the one or more first additives comprising a first viscosity reducing agent.

19. The method of claim 18, wherein the first polymeric material has a second MFR from about 100 to about 2500 g/10 min as determined by ASTM D1238 (230 C°/2.16 kg).

20. The method of claim 12, further comprising a step of forming or providing a second nonwoven layer, wherein the second nonwoven layer comprises a spunbond layer, a meltblown layer, a bonded carded web of staple fibers, a mechanically consolidated layer, or any combination thereof, and bonding the first nonwoven layer and the second nonwoven layer together to form a multilayer nonwoven fabric.

* * * * *